E. U. HOLTON.
FERTILIZER MIXING APPARATUS.
APPLICATION FILED JUNE 7, 1910.

981,563.

Patented Jan. 10, 1911.
3 SHEETS—SHEET 1.

Witnesses
E. Larson
H. M. Brooks

Inventor
Edward U. Holton
By Beeler & Robb
Attorneys

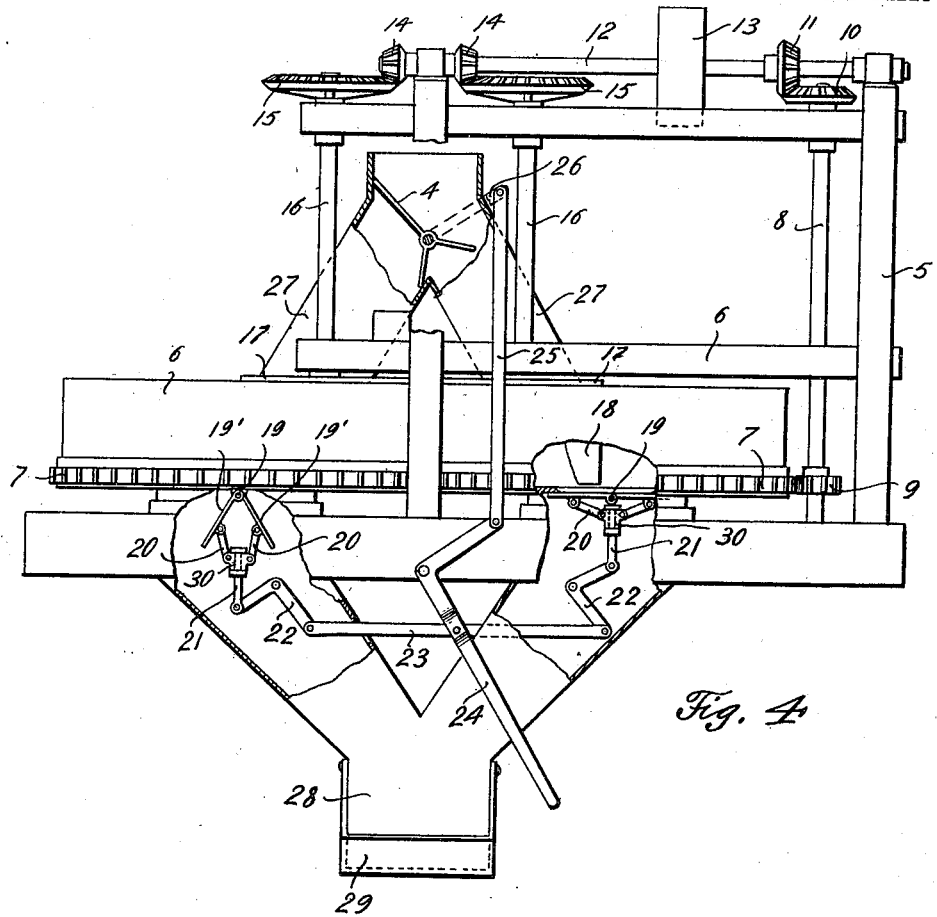
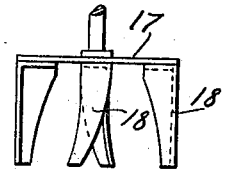

UNITED STATES PATENT OFFICE.

EDWARD U. HOLTON, OF CARTERET, NEW JERSEY.

FERTILIZER-MIXING APPARATUS.

981,563.

Specification of Letters Patent. Patented Jan. 10, 1911.

Application filed June 7, 1910. Serial No. 565,456.

*To all whom it may concern:*

Be it known that I, EDWARD U. HOLTON, a citizen of the United States, residing at Carteret, in the county of Middlesex and State of New Jersey, have invented certain new and useful Improvements in Fertilizer-Mixing Apparatus, of which the following is a specification.

This invention embodies an improved apparatus or machine designed particularly to be used in fertilizer mills or works for treatment and milling of fertilizer to render the same marketable.

The invention comprises particularly certain mixing apparatus for operation upon the fertilizer after the latter has been reduced to a certain fineness, and whereby the product when ready for the market will be a homogeneous or regular mixture, a result not obtained in the use of present apparatus for making fertilizers.

For a full understanding of the present invention, reference is to be had to the following detail description and accompanying drawings, in which—

Figure 1:
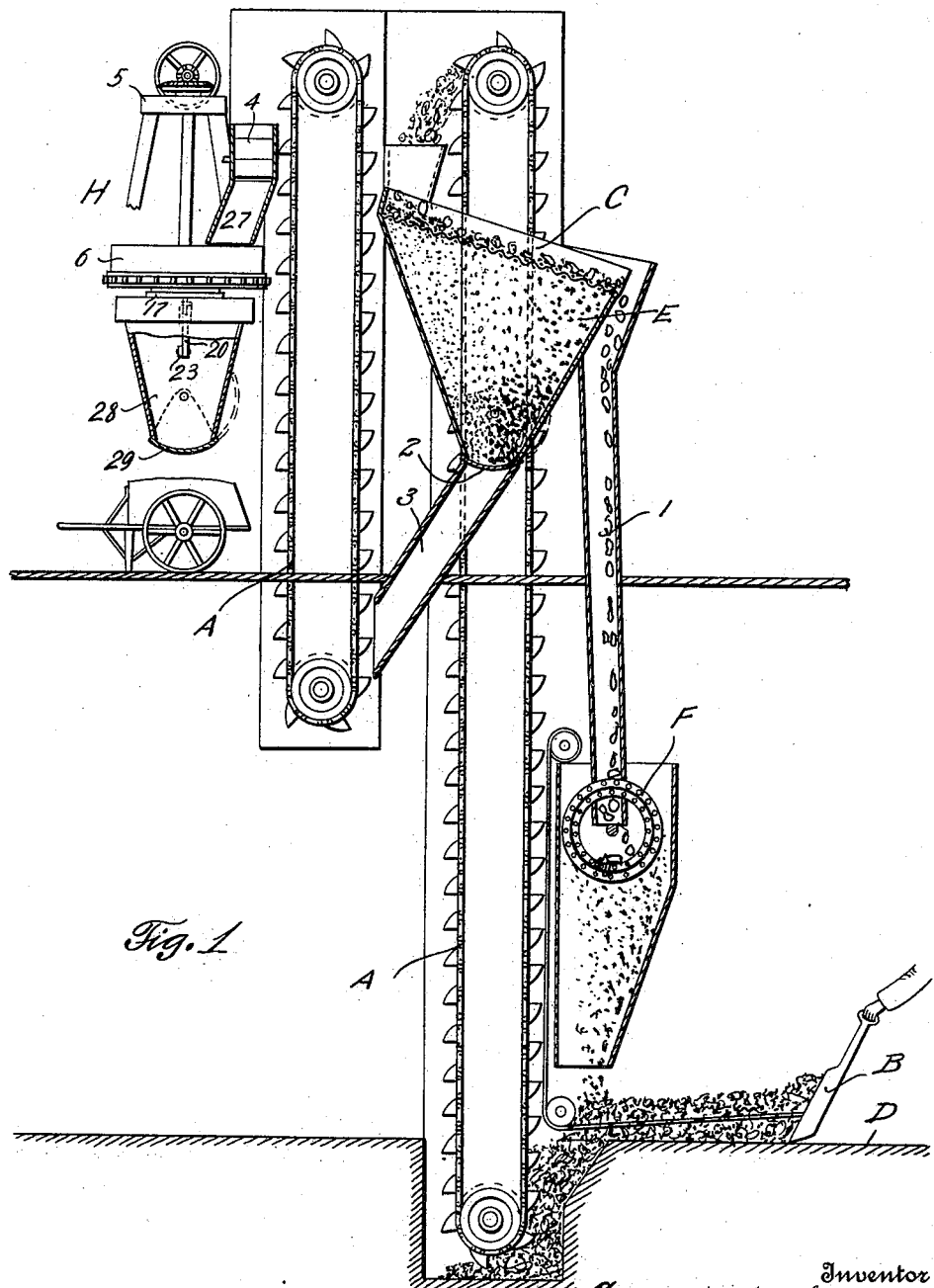
Figure 2:
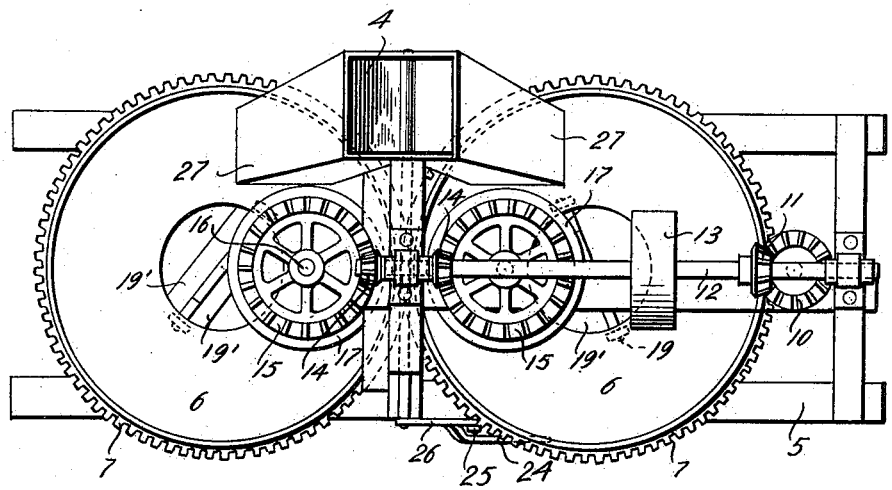
Figure 3:
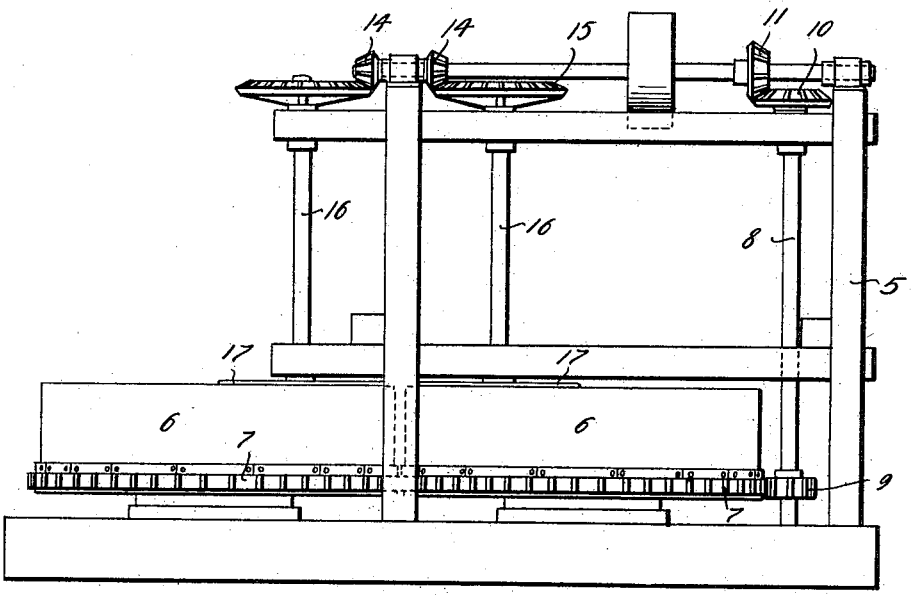

Figure 1 is a view partially in side elevation and part in section, showing a machine or apparatus built in accordance with the principal features of the present invention; Fig. 2 is a top plan view showing more particularly the arrangement and operating mechanism associated with the mixing pans; Fig. 3 is a side elevation of the mixing devices shown in Fig. 2, certain parts omitted; Fig. 4 is an end view showing more clearly the side by side arrangement of the mixing pans and operating mechanism whereby the fertilizer is fed to one pan or the other and discharged therefrom; Fig. 5 is a detail view of the stirrer which operates in each mixing pan.

Throughout the following description and on the several figures of the drawings, similar parts are referred to by like reference characters.

In the drawings, A denotes an elevator of any suitable type and B a power shovel used to draw the fertilizer materials to the elevator to be carried upwardly by the latter and dropped upon a suitable sieve C arranged adjacent to the upper portion of the elevator.

As is well known, different materials are employed for making fertilizer, among which are tankage, blood, azotin, ammonite, nitrate of soda, sulfate of ammonia, acid phosphate, ground bone, bone black, muriate of potash, sulfate of potash, etc., and these materials are collected in a batch on the floor D and carried upwardly by the elevator after being fed to the latter by means of the power shovel B. The various materials before referred to are of different fineness, running from material in comminuted form to large pieces of solid lumped form, said materials being of different density or hardness and of different specific gravity, rendering it impossible to mix the same so as to obtain a regular or uniform mixture. For the above reason, the materials are fed by the elevator A to the sieve or screen C, and the finer portions of the materials pass through the screen into the hopper E. Larger particles of the materials dropped on the screen C fail to pass through the latter and are fed from the screen to a vertical chute 1, leading downwardly to a disintegrator F, where they are operated upon, and returned to the batch of fertilizer materials collected at the base of the elevator near the shovel B.

When the different materials are dropped on the screen C, it will be apparent that the finer materials will pass through said screen at its upper end while the coarser materials go through the screen at the lower end. The materials after passing through the screen C are sufficiently fine to represent a commercial or marketable product, and constitute an efficient mixture as a fertilizer agent. It is found, however, in the actual operation of a mill comprising the several parts before described, that the materials of the fertilizer when deposited in the hopper E through the screen C are divided by the operation, the material which is the finest, goes through the screen C first and drops into the hopper E immediately under the upper end of the screen C at the elevated end, and the material that passes through screen C at the lower end, is coarser and drops into the hopper E immediately under the lower end of the screen, with the result that the hopper E will contain fine material on one side and coarser material on the other side, the same relation of coarse and fine material will emerge from the hopper into the cart or car and then when dumped into a pile, the finer material will remain in the center of the pile while the larger or coarser material will run to the outer edge. Such a pile is not uniform or regular under analysis because of the division of the material in the pile. Because of the nonuniformity of the product aforesaid it has been necessary to allow an extra percentage, or add more of certain material subjected to the treatment above described to insure the production of a fertilizer having the minimum requirements, the present methods failing to supply or produce a mixture which is uniform or homogeneous, for which reason the addition of a proportion of each material of the fertilizer has become necessary over and above the proportion that would be required by proper mixture.

The present invention consists in the provision of means for treatment of the fertilizer materials after they have been reduced to a certain fineness required for commercial purposes, whereby the irregular mixture received by the hopper E is worked into a uniform or homogeneous mass.

From the hopper E, which has a bottom closing valve 2, a chute 3 leads downwardly to feed the fertilizer materials to an auxiliary elevator A′ by which the materials are carried upwardly and dumped upon a saddle valve 4 mounted on a suitable framework 5 arranged above a pair of mixing pans 6.

The mixing apparatus now described is shown at H in Fig. 1, and includes the mixing pans 6 provided with intermeshing gears 7 by which said pans are caused to simultaneously operate through a drive shaft 8. The drive shaft 8 has a spur-gear 9 on its lower end meshing with a gear 7 of the adjacent pans 6, and a bevel gear 10 on the upper end of the shaft 8 meshes with a similar gear 11 on a power shaft 12 adapted to be driven by a pulley 13 or any similar means. The shaft 12 also has bevel gears 14 arranged in mesh with similar gears 15 mounted on the upper ends of drive shafts 16 carried in suitable bearings in the frame work. Connected with the lower ends of the drive shafts 16 for operation thereby are the rotary stirrers 17, each of which consists of a supporting head or plate having a plurality of stirring arms or plows 18 projecting downwardly therefrom for direct operation upon the materials dumped into the pans 6. The stirrers or mixing devices 17 are rotated simultaneously with the pans 6, being otherwise relatively stationary with respect to said pans as the latter turn. The normal tendency of the stirrers 17 is to push the materials in the pans 6 toward the middle of said pans, at which portions are mounted the discharge means for the pans comprising the central valves 19, each composed of semi-circular sections 19′ hingedly or pivotally connected at adjacent edge portions. The valves 19 open downwardly and are operated by toggle levers 20 connected with a vertical plunger 21, the latter in turn being connected by a bell crank 22 with a bar 23. The valves 19 are connected to the bar 23 by the same devices, and an operating lever 24 is employed to actuate said devices whereby to close one valve and simultaneously open the other. The operating lever 24 is furthermore connected by a rod 25 with an arm 26 on the shaft of the saddle valve 4, the purpose of such arrangement of parts being to enable the operator to actuate the saddle valves and the discharge valves simultaneously.

By operating the lever 24, the saddle valve is thrown into a position causing the material fed thereon to pass downwardly through a suitable chute 27 into one of the pans, and when the saddle valve is in this position, the lever 24 will hold the discharge valve 19 of the pan 6 receiving the material in a closed position. Thus as the material feeds to a pan 6, the discharge valve is closed and immediately said discharge valve is opened, the feeding of the material to said pan is cut off and directed to the other pan, the discharge valve of which has been simultaneously closed upon opening the discharge valve of the first mentioned pan. From the pans 6, the materials are discharged into a hopper 28 normally closed by a bottom valve 29 from which said materials may be taken in predetermined amounts and whenever desired.

A peculiar feature of the present invention resides not only in obtaining the effective and thorough mixture of the materials in the pans 6 after said materials have been reduced to a certain fineness for commercial purposes, but in continuing the mixing of the materials as they are delivered from the pans 6. The continued mixing action is obtained by the special valves 19 employed, the sections of the latter when opened dropping downwardly to form members rotating with the pans 6 and giving the materials being discharged from said pans a swirling movement, affording a final mixing operation.

The materials from which the fertilizer is made when discharged into the hopper 28 form a homogeneous or regular mixture of uniform chemical analysis and efficiency as a fertilizing agent, rendering it unnecessary to add a material percentage to the original proportions of materials used in order to produce a commodity coming up to minimum requirements.

In the operation of the apparatus above described, the necessity for using any scraping means for emptying the mixing pans or to assist in the discharge of the contents thereof is eliminated and this is especially advantageous because it is also unnecessary to employ associated complicated operating means for such scraping device or devices.

and usually located above the mixing pans. The operating means for the discharge valves of the pans has a swivel connection therewith at 30 to permit the valves to turn with the pans, and while arranged in the path of the discharges of the latter.

I claim:

1. In a fertilizer mixing apparatus, the combination of a pair of mixing pans, a saddle valve operable to direct the material to either of said pans, discharge valves for the pans, an arm connected with the saddle valve for tilting same, bell cranks operably connected with the discharge valve, a rod connecting said bell cranks, and a lever operably connected with the saddle valve arm and said rod for simultaneously actuating the discharge and saddle valves.

2. In a fertilizer mixing apparatus, the combination of a mixing pan provided with a discharge opening, a discharge valve normally closing said opening, a plunger, a swivel connection between said plunger and the discharge valve permitting the valve to rotate independently of the plunger, means for actuating the plunger to open and close the discharge valve, a connection between the discharge valve and pan, and means for rotating the pin with its discharge valve.

3. In a fertilizer mixing apparatus, the combination of a pair of mixing pans, discharge valves therefor, means for simultaneously opening the discharge valve of either pan and closing the discharge valve of the other pan, means for rotating the pans, and devices connecting the discharge valves with the operating means therefor, permitting rotation of the discharge valves with their pans.

4. In a fertilizer mixing apparatus, the combination of a mixing pan, means for rotating the same, a discharge valve at the bottom of said pan arranged in its discharge path, means for opening said valve, and means connecting said valve with its opening means, permitting rotation of the valve with the pan.

5. In a fertilizer mixing apparatus, the combination of a mixing pan having a discharge opening at its lower end, means for rotating said pan, and a discharge valve in the discharge opening of the pan comprising a member rotatable with the pan.

6. In a fertilizer mixing apparatus, the combination of a mixing pan, means for rotating said pan, and a discharge valve arranged at the bottom of the pan and comprising downwardly opening sections movable into divergent positions and rotatable with the pan, said sections being arranged in the path of the discharge of the pan.

7. In a fertilizer mixing apparatus, the combination of a mixing pan, means for rotating said pan, and a discharge valve therefor adapted to open into a position to deliver material from the pan and simultaneously give said material a swirling movement.

In testimony whereof I affix my signature in presence of two witnesses.

EDWARD U. HOLTON.

Witnesses:
FRANCIS M. PIRRONG,
JNO. A. DAVIS.